United States Patent

[11] 3,542,165

| | | | |
|---|---|---|---|
| [72] | Inventor | Rene Lucien Neuilly sur Seine, France | |
| [21] | Appl. No. | 720,818 | |
| [22] | Filed | April 12, 1968 | |
| [45] | Patented | Nov. 24, 1970 | |
| [73] | Assignee | Messier Paris, France | |
| [32] | Priority | June 30, 1967 | |
| [33] | | France | |
| [31] | | No. 112,718 | |

[54] AUTOMATIC WEAR-COMPENSATION DEVICE FOR BRAKES OF ALL TYPES
4 Claims, 9 Drawing Figs.

[52] U.S. Cl. .................................................... 188/196, 188/73
[51] Int. Cl. ........................................................ F16d 65/54, F16d 55/18
[50] Field of Search ........................................... 188/72 —73C, 196, 196P

[56] References Cited
UNITED STATES PATENTS

| 3,312,311 | 4/1967 | Dixon | 188/196(P)UX |
| 3,376,959 | 4/1968 | Holcomb et al. | 188/196 |
| 3,434,574 | 3/1969 | Barone | 188/196(P)UX |

*Primary Examiner*—Duane A. Reger
*Attorney*—Waters, Roditi Schwartz and Nissen

ABSTRACT: An automatic wear-compensation device for a brake mechanism comprises a tube which is made radially elastic by the provision of longitudinal slots therein and which is rigidly fixed to the fixed portion of the brake, the tube being surrounded by a socket having two internal collars spaced apart by the desired clearance when the brakes are released, the socket being rigidly connected to the moving portion of the brake. A rod is slidably mounted within the tube and has a round head at one end and a cylindroconical portion at the other end, there being a ring with a round bore having a profile corresponding to the cylindroconical profile on the rod, the ring being mounted around the tube and between the two collars of the socket. A compression spring is supported against the head of the rod and against the ring, to clamp the ring on the tube and the tube on the rod.

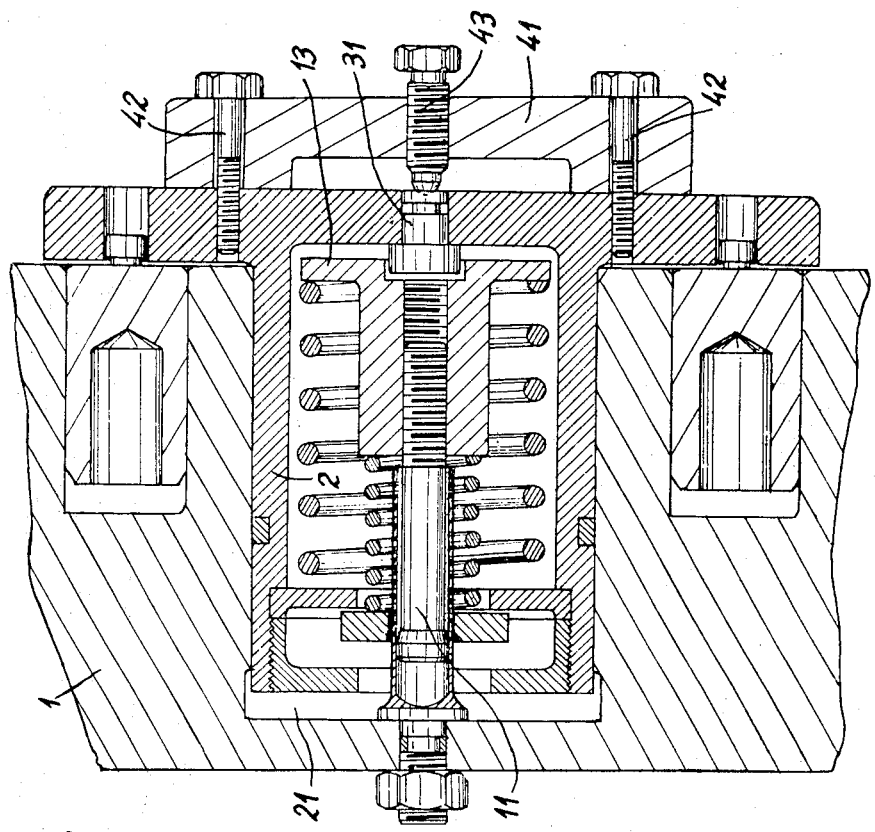
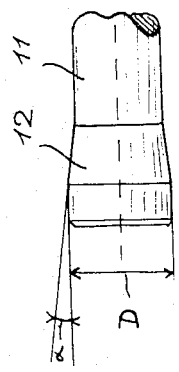
Fig. 6
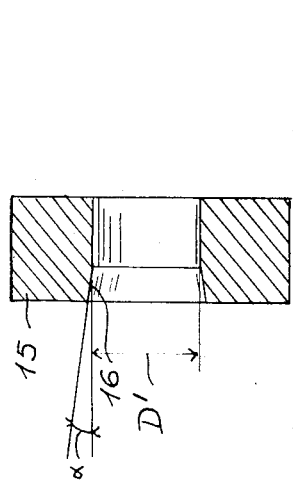
Fig. 4
Fig. 5
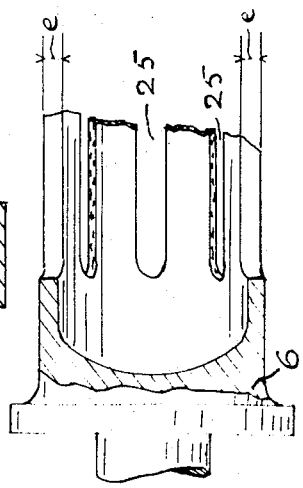
Fig. 3

AUTOMATIC WEAR-COMPENSATION DEVICE FOR BRAKES OF ALL TYPES

One of the problems encountered in brakes is the automatic compensation of wear of friction linings, so as to maintain their approach-travel constant and therefore to maintain constant the response time of the brake.

This problem is solved by equipping a brake with an automatic wear-compensation device, of which a large number of types are already in existence.

This compensation for wear must be achieved more and more in a continuous manner by reason of the use of linings with low wear, and this eliminates all the systems of release at regular intervals.

The majority of the devices for continuous compensation of wear which are at present known are friction systems which have inherent disadvantages of this principle, namely:

Necessity of providing excess forces so as to prevent variations of the coefficient of friction due, in particular, to the variation in operation of the surface condition of the parts in frictional contact.

The friction force being the same in both directions, a non-negligible part of the power available for applying the friction linings against the corresponding track of the brake is utilized in advancing the automatic wear compensation device, when this is necessary.

In consequence, the invention has for its object an automatic wear-compensation device which eliminates these disadvantages.

The invention has also for its object a device of this kind which is reliable and simple, and therefore economical.

The present invention essentially utilizes the principle of locking by jamming as a replacement of the principle of friction for the construction of an automatic wear-compensation device.

This principle which locks the parts in the desired position is particularly reliable and preserves the clearance embodied in a new brake, irrespective of the degree of wear of the friction linings.

This principle of locking by jamming has already been applied but without obtaining all the advantages of the invention. For example, it has been proposed to jam balls between cones and against cones; in order to operate correctly however, this system leads to a complicated, bulky and expensive construction. To take another example, it has been proposed to jam a conically-bored ring on a conical ring, but without ensuring positive jamming and releasing at the instants when they become necessary, or again while absorbing a considerable and nondetermined force for the releasing.

In consequence, the invention has for its object an automatic wear-compensation device applying the principle of locking by jamming, in which the jamming and release are ensured in a positive manner and without absorbing any substantial force.

Briefly, the device according to the invention comprises a tube rendered elastic radially by longitudinal slots and rigidly fixed to a part of the brake (for example to the fixed part), around the said tube, a socket provided with two internal collars spaced apart by the desired clearance when released and rigidly fixed to the other part of the brake (for example to the moving part), a rod having a round head with a chosen profile (for example cylindroconical) sliding in the said tube, a ring having a round bore with a profile parallel to the said chosen profile at an interval less than the thickness of the said tube, placed between the two collars and clamping the tube on the end piece of the rod by the action of a restoring spring supported against a shoulder at the other extremity of the rod.

The simplicity of the device according to the invention will be noted —it comprises only a very small number of parts, and these are parts of revolution —and also its robust nature is evident— the jamming surfaces can readily be over—dimensioned with respect to the forces brought into play.

The operation of the device according to the invention and one embodiment of the invention relating to a disc brake operated by jacks, will now be described with reference to the accompanying drawings, given by way of nonlimitative examples. In these drawings:

FIGS. 1a, 1b, 1c and 1d are diagrammatic axial sections showing the principle of the structure of the device according to the invention and its operation:

FIG. 1a illustrates the position of rest;
FIG. 1b shows the end of the approach-travel;
FIG. 1c shows the end of the brake-application period;
FIG. 1d shows the end of the brake-release period;

FIGS. 3, 4 and 5 are axial sections, respectively of the slotted tube, the rod with the cylindroconical end piece, and of the ring with a cylindroconical bore, of the brake in accordance with FIG. 2;

Figure 2:
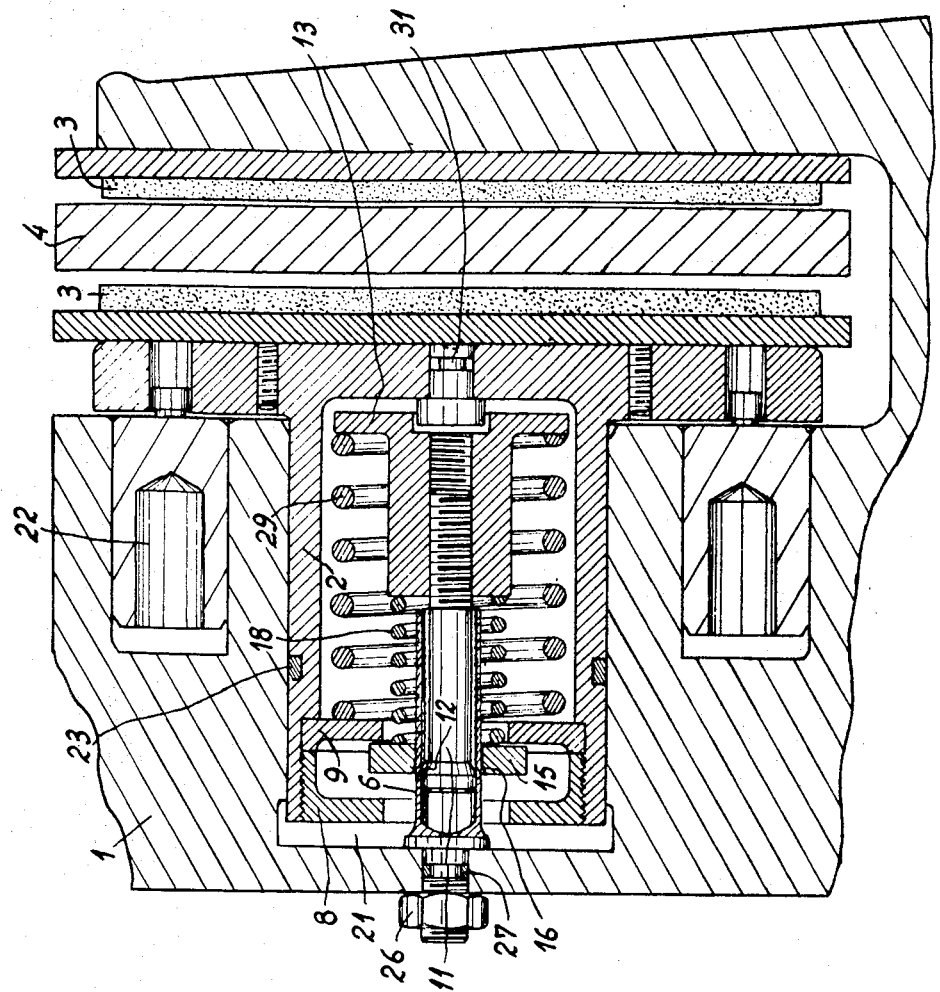
FIG. 2 is an axial section of a disc brake operated by jacks and equipped with a device in accordance with the invention.

FIG. 6, similar to FIG. 2, represents, for changing worn linings, the replacement in position of the moving part of the brake.

Referring now to FIG. 1, the brake shown comprises a fixed portion 1, a moving portion 2 with a brake lining 3 which can come into frictional engagement on a drum or disc 4 under the action of actuating members (not shown) which of course effect the engagement and the release of the brake. According to the invention, the fixed portion 1 is rigidly fixed to a tube 6, made radially elastic by means of longitudinal slots, and the moving portion 2 is rigidly fixed to a socket 7 which has two internal spaced collars 8 and 9. In the tube 6 is adapted to slide a rod 11 with an end piece 12 widened in the form of a cone, and with a shoulder 13 at the other extremity.

Around the tube 6 is placed, between the collars 8 and 9 of the socket 7, a ring 15 with a conically-flared bore 16. The ring 15 jams the tube 6 on the cone 12 of the rod 11 by the action of a restoring spring 18 mounted between the ring 15 and the shoulder 13 of the rod 11. The clearance J (FIG. 1a) of the ring 15 between the collars 8 and 9 is, according to the invention, equal to the desired clearance J between the friction lining 3 and the drum or disc 4, as will be shown later.

Figure 1A:
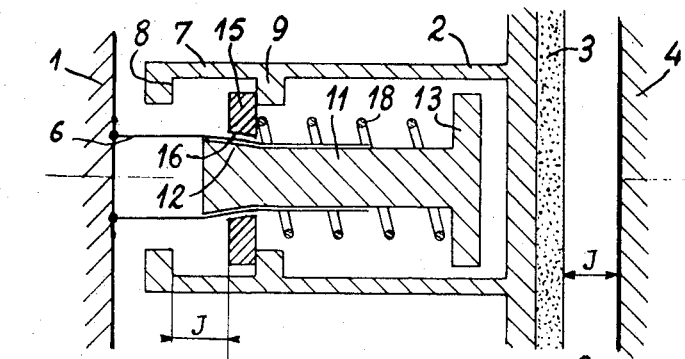
Figure 1B:
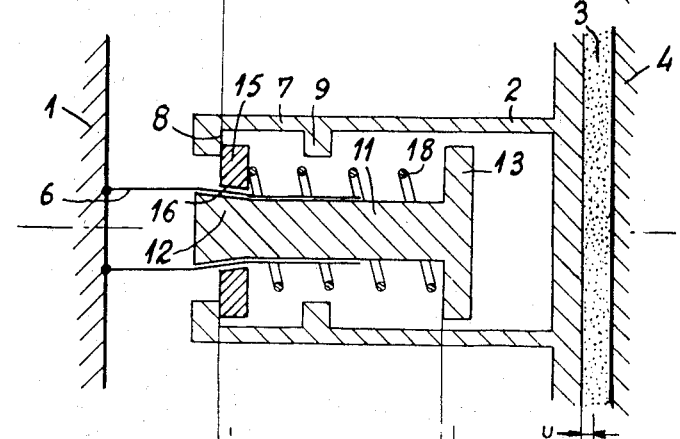
Figure 1C:
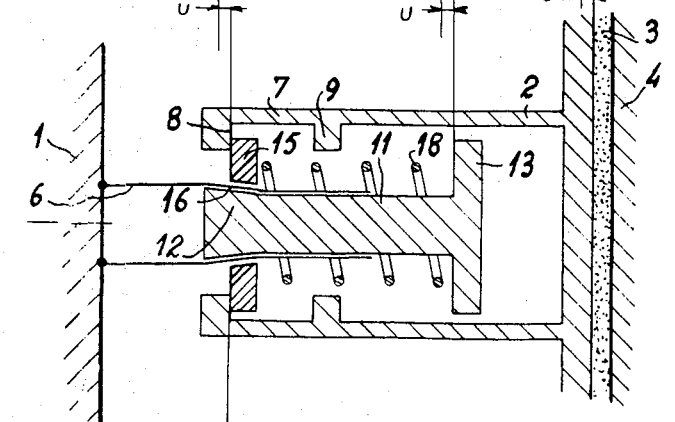
Figure 1D:
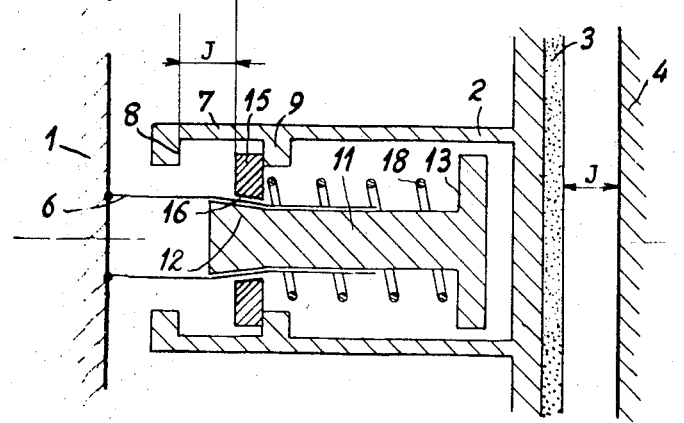

FIG. 1a shows the brake at rest. When braking occurs, the moving portion 2, after an approach-travel equal to J, comes into contact with the drum or disc 4 (FIG. 1b). During this travel J, the rod 11 and the ring 15 have not moved; the collar 8 of the socket 7 has come into contact with the ring 15.

During the braking action, there takes place a wear U of the friction lining 3 (FIG. 1c), the moving portion 2 being of course displaced through this travel U. The collar 8 of the socket 7 pushes back the ring 15 through the same distance U, and the spring 18 causes the rod 11 to slide in the tube 6, the conical end piece 12 of the rod 11 sliding inside the tube 6 while following the movement of the conical bore 16 of the ring 15. Finally, from the position 1b to the position 1c, all the movable parts are displaced as a unit through the distance U.

When the brake is released, the ring 15 keeps the rod 11 jammed in the tube 6 and (FIG. 1d) the moving portion 2 moves back (under the action of the actuating devices, not shown, as already stated) through the distance corresponding to the clearance J between the ring 5 and the collars 8 and 9. The lining 3, irrespective of its wear U, is therefore disengaged by the clearance J, as was previously stated.

FIGS. 2 to 6 represent a disc brake with double operation by jacks, equipped with a device according to the invention. The parts already described will again be found in these FIGS. with the same reference numbers.

Referring now to FIG. 2, this disc brake is mainly constituted by one or a plurality of moving discs 4 adapted to be gripped between the friction linings 3, which are subjected to the clamping force developed for example by the piston or pistons of a hydraulic press.

The hydraulic press or cylinder block 1 comprises cylinders 21 in which are mounted a series of pistons. In the case of a brake with a double circuit, the cylinder block may also comprise a second series of pistons 22, this being of no importance to the principle of operation of the automatic device for compensating wear of the friction linings. Each piston 2 is hollow and carries at its rear portion a front abutment ring 9 which comes into engagement against a shoulder of the piston 2 and is immobilized by a rear abutment nut 8 which is screwed into the body of the piston 2. The piston 2 is provided with a sealing joint 23.

In the bottom of the bore of the cylinder 21 there is fixed on the cylinder block 1 a tube 6 hollow on the piston side and comprising a number of slots 25 cut in "tulip" fashion along its generator lines as shown in FIG. 3. These slots have the purpose of permitting elastic deformation of the tube 6.

The tube 6 is bolted to the cylinder block 1 by means of a nut 26. Fluidtight sealing is obtained by mounting a joint 27 on the tube 6.

On the tube 6 is adapted to slide a ring 15 having a cylindroconical bore 16. Over its external diameter, the ring 15 can be supported against the front stop ring 9 or against the nut 8 of the rear stop.

Inside the hollow portion in the interior of the tube 6 is adapted to slide a rod 11 having a cylindroconical end piece 12. The conicity of this end piece is the same as that of the bore in the ring 15. This rod 11 is rigidly fixed by means of threading or by any other means to an abutment socket 13. Between the socket 13 and the ring 9 is mounted the restoring spring 29 of the piston. Between the socket 13 and the ring 15 is mounted a spring 18. Finally, the front face of the piston 2 is provided with a release plug 31.

In a brake, and in particular in the disc brake described above, it is necessary to retain during the entire period of its use, an operating clearance J between the friction linings and the disc or discs, so that on the one hand there is no residual braking and on the other hand the approach-travel of the pistons is made as small as possible.

For the explanation of the operation of the automatic wear-compensation device, there will be taken as an example a brake with a hydraulic control as previously described.

This example is not given in any restricted sense, since the gripping force of the brake may equally well be pneumatic, electric, mechanical or of any other origin, without thereby modifying the principle of the invention.

Thus, when the pressure is admitted to the cylinder 21, the piston 2 moves until the disc 4 is gripped between its friction linings 3.

As it moves forward, the piston 2 compresses the restoring spring 29 between the front abutment ring 9 and the abutment socket 13. The abutment socket 13 is immobilized with respect to the cylinder block 1 by the locking which takes place between the rod 11 and the "tulip" tube 6 and the ring 15.

The diameter of the cylindroconical end piece 12 of the rod 11 is represented by D, and its half-angle at the apex is $\alpha$ (see FIG. 4). The diameter of the bore of the ring 15 is D' and the half-angle at the apex of its cone is also $\alpha$ (see FIG. 5). The difference between the internal and external bores of the "tulip" tube 6 is 2e (see FIG. 3). The geometry of these three parts is such that D'—D is less than 2e. In consequence of this dimensioning, the tulip tube 6 cannot be housed between the cylindrical parts of the bore of the ring 15 and of the rod 11. The tongues of the tube 6 bend elastically and thus pass between the cone 12 of the rod 11 and the internal cone 16 of the ring 15. The elastic bending of each tongue is of course very small, and is furthermore limited by the rod 11. In practice these tongues are only very slightly conical and remain almost cylindrical.

Thus, under the force of the springs 29 and 18, the jamming of the tulip tube 6 between the rod 11 and the ring 15 ensures the locking of the assembly in position, in particular that of the abutment socket 13. When the pressure is released, the piston 2 is returned towards the rear by the spring 29, until the front abutment ring 9 comes into contact with the ring 15. At that moment the assembly is at rest, and the locking effect between the parts 15, 6 and 11 subsists due to the force of the springs 29 and 18. The function of the spring 18 is to maintain a locking force on the ring 15 when the piston 2 moves forward, carrying with it the front abutment ring 9 which then no longer supports the ring 15.

Between this ring 15 and the rear abutment nut 8 there exists a clearance J which is that which it is desired to maintain between the discs of the brake and its friction linings.

When the piston 2 moves forward through a distance less than this clearance J, the operation of the system is such as already described above, that is to say the parts 15, 6 and 11 remain locked together. If, as a result of wear of the friction linings for example, the piston 2 moves forward by a distance greater than the clearance J, the rear abutment nut 8 then comes into contact with the ring 15 and displaces it. When this takes place, the system is released and the rod 11, by the effect of the springs 29 and 18 applied against the socket 13, moves forward until it again becomes locked in the new position of the ring 15.

When the pressure in the brake is released, the spring 29 returns the piston 2 towards the rear until the front abutment ring 9 again comes into contact with the ring 15, the latter having moved forward by the distance representing the wear of the friction linings.

Thus, as the friction linings wear, the ring 15 moves forward, together with the rod 11 and the socket 13, ensuring constantly a working clearance J between the disc or discs and the friction linings. When the linings are completely wornout and are replaced, the piston 2 must be brought back into its initial position, as shown in FIG. 6.

For this purpose, there is fixed on the piston 2 a flange 41, for example by means of two screws 42. This flange is provided at its center with a screw 43 which, when it is screwed-in, pushes on the release plug 41. This plug 41 then pushes against the socket 13 which displaces the rod 11, and this has the effect of unlocking the system.

It is then only necessary to push back the piston 2 to the bottom of its cylinder 21. By removing the flange 41, the system becomes locked in its position and the cycle can recommence.

I claim:

1. An automatic wear-compensation device for brakes of all types having a fixed portion and a portion with a friction lining and means for actuating the brake, said device comprising a tube made radially elastic by longitudinal slots and rigidly fixed to one part of the brake; a socket around the tube with two internal collars spaced apart by the desired clearance when released and rigidly fixed to the other part of the brake; a rod with a round head at one end and a portion at the other end having a diameter greater than the diameter of the rod and joined thereto by a profile of progressively decreasing diameter, said rod being adapted to slide in the said tube; a ring with a round bore having a profile corresponding to the said profile on the rod at an interval smaller than the thickness of the said tube and mounted between the said two collars of the socket; and a compression spring supported against said head of the rod and against the said ring, and clamping the said ring on the said tube and the said tube on the rod.

2. An automatic wear-compensation device for a brake, comprising a fixed portion with a jack cylinder and a piston adapted to clamp friction linings against a disc, each piston being hollow and comprising at its rear portion an abutment ring and an abutment nut, the opposite internal faces of which are spaced apart by the desired working clearance of the brake; a hollow tube comprising a plurality of longitudinal slots and fixed axially in the bottom of the said cylinder; a ring with a cylindroconical bore slidable on the said tube between the first-mentioned ring and the said nut; an abutment socket within the piston; a rod having a cylindroconical head rigidly fixed to said abutment socket and adapted to slide in the said tube, the conical angles of the bore of the said second ring and of the head of the said rod being equal and their diameters differing by less than twice the thickness of the said hollow tube; a restoring spring for the said piston mounted between the socket and the said first ring; and a restoring spring for the device mounted between the said socket and the second said ring.

3. A device in accordance with claim 2, comprising a plug axially mounted in the front face of said piston and adapted for being pushed by a screw turning in a screwed flange, the plug then pushing against the said socket and the said rod so as to unlock the assembly of said device.

4. A device in accordance with claim 1 wherein said portion of the rod at said other end is cylindrical and said profile is linear whereby a cylindroconical profile is provided at said other end.